United States Patent
Cousineau (10) Patent No.: US 7,916,812 B2
(45) Date of Patent: Mar. 29, 2011

(54) DETERMINING MODULO COUNT IN SLEEP CAPABLE SYSTEM

(75) Inventor: Kevin Stuart Cousineau, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 969 days.

(21) Appl. No.: 11/370,521

(22) Filed: Mar. 7, 2006

(65) Prior Publication Data

US 2006/0222108 A1     Oct. 5, 2006

Related U.S. Application Data

(60) Provisional application No. 60/660,803, filed on Mar. 10, 2005.

(51) Int. Cl.
*H04L 27/00*     (2006.01)
(52) U.S. Cl. ........................................ 375/324
(58) Field of Classification Search .................. 375/324, 375/354–355, 371
See application file for complete search history.

(56) References Cited

U.S. PATENT DOCUMENTS

| | | | | |
|---|---|---|---|---|
| 5,982,826 | A * | 11/1999 | Betts et al. | 375/354 |
| 7,133,483 | B1 * | 11/2006 | Kramer et al. | 375/371 |
| 7,426,528 | B2 * | 9/2008 | Denk | 708/252 |
| 2004/0161018 | A1 | 8/2004 | Maric | |

FOREIGN PATENT DOCUMENTS

| | | |
|---|---|---|
| EP | 1 473 881 A | 11/2004 |
| EP | 1 473 881 A2 | 11/2004 |
| JP | 64042929 | 2/1989 |
| JP | 05276155 | 10/1993 |
| JP | 2003152551 | 5/2003 |
| KR | 10-2004-0059343 | 7/2004 |

OTHER PUBLICATIONS

Cavanagh, Joseph J.F., "Digital Computer Arithmetic Design and Implementation," 1984, Ch. 4, pp. 236-253, McGraw-Hill Book Company, New York, XP-002389578.

Hwang, Kai, "Computer Arithmetic Principles, Architecture, and Design," 1979, Ch. 7, pp. 213-249, John Wiley & Sons, New York, XP009069188.

(Continued)

*Primary Examiner* — Khanh C Tran
(74) *Attorney, Agent, or Firm* — Gerald P. Joyce, III (57) ABSTRACT

Apparatus and methods of determining a modulo count of a synchronization number in a sleep capable system. The synchronization number is stored in a comparison register, and a comparison number equal to the largest power of two multiple of the modulus within a predetermined range is subtracted from the synchronization number. If the difference is zero, the difference is stored in the comparison register, replacing the previous number stored in the register. If the difference is less than zero, the number stored in the register remains unchanged. The comparison number is right shifted, resulting in division by two. The process is repeated for a number of loops equal to the power of two, or until the difference is less than the modulus.

40 Claims, 7 Drawing Sheets

OTHER PUBLICATIONS

"Basic Division Schemes," Ch. 13, pp. 211-224, XP-002247739.

Joseph J. F. Cavanagh: "Digital Computer Arithmetic: Design and Implementation—Chapter 4: Fixed Point Restoring Division", 1984, Mcgraw-Hill, New York.

Kai Hwang: "Computer Arithmetic: Principles, Architecture, and Design—Chapter 7: Dividers", 1979, John Wiley and Sons, New York.

Behrooz Parhami: "Computer Arithmetic, basic division schemes". Computer Artihmetic : Algorithms and Hardware Designs, New York: Oxford Univiersity Press, US, 2000, pp. 211-224.

International Search Report—PCT/US06/008947, International Search Authority—European Patent Office—Jul. 27, 2006.

Written Opinion—PCT/US06/008947, International Search Authority—European Office—Jul. 27, 2006.

\* cited by examiner

DETERMINING MODULO COUNT IN SLEEP CAPABLE SYSTEM

CROSS-REFERENCES TO RELATED APPLICATIONS

The present application claims priority to Provisional Application No. 60/660,803, entitled "METHOD FOR DETERMINING MODULO COUNT FOR A SLEEP CAPABLE SYSTEM" filed Mar. 10, 2005, and assigned to the assignee hereof and expressly incorporated by reference herein.

BACKGROUND

I. Field

The present disclosure relates generally to the field of electronic communication. More particularly, the present disclosure relates to determining a modulo count for synchronizing a sleep capable system.

II. Background

Wireless communication devices are continually increasing the range of functions that are offered to a user. Advancements in processor and display capabilities facilitate the integration increasingly complex operations and interfaces.

Processors used in portable wireless communication devices routinely have the capability of executing millions of operations per second, enabling the device to perform complicated processing necessary in advanced communication systems. Processors have the ability to process images for display that may have been compressed or otherwise encoded. Additionally, processors can process interactive bit-mapped images for display that form part of a graphical user interface.

Similarly, one or more portable displays are commonly integrated into portable wireless communication devices. Indeed, displays are so common that it is unusual for portable electronics to lack any type of display. Displays have improved from simple seven segment displays to bit-mapped color displays having tremendous resolution.

However, a disadvantage associated with the increased processor capabilities and the advancement in display technologies is the amount of power required to operate the devices. Wireless Communication devices may also implement clocks or other functions that need to be continuously energized even when the device functionality is turned off.

Although battery technologies have advanced to some extent, they have been unable to keep pace with the power requirements attributable to increased device functionality. The individual components may require more power because of increased capabilities, or the wireless communication device may implement more components in order to expand functionality, thereby increasing the total power requirement.

Compounding the heavy strain on the battery capacity is the continued efforts to further miniaturize portable electronic devices. Design efforts to minimize the physical size and the weight of wireless communication devices limit or reduce the volume allocated to batteries.

The physical design constraints are further compounded with the desire to increase the device operating time capability. In wireless communication devices such as cellular telephones, such operating time capability is often measured in terms of "battery time," "talk time," or "standby time."

Various techniques can be used to extend the operating time capability of a wireless communication device. One such technique is referred to as "sleep mode." Sleep mode typically refers to a condition where the wireless communication device is partially de-energized to conserve power. A device may transition to the sleep mode after a prolonged period of inactivity. Alternatively, a device may periodically transition to the sleep mode in between scheduled periods of operation.

The device typically is unable to communicate or otherwise interface with the user during the duration of the sleep. However, wireless devices typically integrate sleep mode into the device operation in a manner that is virtually unnoticeable by the user. The sleep mode is distinct from a de-energized or powered off mode in that the sleep mode keeps energized a portion of the wireless communication device, such that the device can quickly transition to an active mode or state.

The wireless communication device may need to acquire wireless communication signals or otherwise re-synchronize with a base station, access point, or central controller when transitioning from the sleep mode to an active mode. The ability of the wireless communication device to quickly transition from the sleep mode to the active mode can further extend the operating time capability by allowing the device to remain in the sleep mode for a maximum period of time.

BRIEF SUMMARY

Apparatus and methods of determining a modulo count of a synchronization number in a sleep capable system are disclosed. The synchronization number can represent a symbol count in an Orthogonal Frequency Division Multiplex (OFDM) system. The synchronization number determined upon wake-up is stored in a comparison register, and a comparison number equal to a largest power of two multiple of the modulus within a predetermined range is subtracted from the synchronization number. If the difference is zero, the difference is stored in the comparison register, replacing the previous number stored in the comparison register. If the difference is less than zero, the number stored in the comparison register remains unchanged. The comparison number is right shifted, resulting in division by two. The process is repeated for a number of loops equal to the power of two, or until the difference is less than the modulus.

A first aspect includes a method of performing a modulo operation that includes generating a difference value based in part on a stored value and a shift register value, wherein the shirt register value is based on a modulus, and determining whether the difference value is less than the modulus.

An aspect includes a method of performing a modulo operation that includes (a) storing an initial value in a first register, (b) storing an initial comparison value in a second register, (c) determining a difference by subtracting the second register value from the first value, (d) determining if the difference is less than zero, (e) storing the difference in the first register if the difference is not less than zero, (f) dividing the second register value by two and storing the result in the second register, and (g) repeating at least a portion of (c) through (f) until the difference is less than a modulus value.

An aspect includes a method of performing a modulo operation that includes storing an initial number as a value in a first register, loading a shift register with an initial comparison value, subtracting a value in the shift register from the value in the first register to obtain a difference value, determining if the difference value is less than a modulus, and if the difference value is not less than the modulus, repeating a process cycle until the difference value is less than the modulus. The process cycle includes determining if the difference value is less than zero, storing the difference value in the first register if the difference value is not less than zero, right shifting the shift register, subtracting the value in the shift register from the value in the first register to update the difference value, and determining if the difference value is less than the modulus.

An aspect includes a method of performing a modulo operation that includes loading a symbol number from a superframe into a register, loading a value into a shift register, loading a difference between the register and shift register into the register if the register value minus the shift register value is greater than zero (0), right-shifting the shift register, and stopping the method if the difference is between a lower limit and an upper limit.

An aspect includes an apparatus configured to perform a modulo operation. The apparatus includes a memory configure to store one of an initial value or a difference value, a shift register configured to store a comparison value, a subtractor coupled to the register and the shift register and configured to subtract a shift register value from a register value to generate the difference value, a first comparator configured to determine if the difference value is less than zero and configured to control the register to store the difference value if the difference value is not less than zero, and a second comparator configured to compare the difference value to a modulus value, and configured to cause the shift register to right shift the comparison value if the difference value is not less than the modulus.

An aspect includes a computer readable media embodying instructions for performing a modulo operation. The instructions include instructions for (a) storing an initial value in a first register, (b) storing an initial comparison value in a second register, (c) determining a difference of the second register value from the first value, (d) determining if the difference is less than zero, (e) storing the difference in the first register if the difference is not less than zero, (f) dividing the second register value by two and storing the result in the second register, and (g) repeating at least a portion of (c) through (f) until the difference is less than a modulus value.

An aspect includes an apparatus configured to perform a modulo operation. The apparatus includes means for storing one of an initial value or a difference value, means for storing a comparison value, means for subtracting the comparison value from the one of the initial value or the difference value to update the difference value, means for comparing the difference value to zero and configured to control the register to store the difference value if the difference value is not less than zero, and means for comparing the comparing the difference value to a modulus value, and configured to cause the means for storing the comparison value to right shift the comparison value if the difference value is not less than the modulus.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

A system can incorporate one or more user terminals having the ability to transition from an active state to a power conserving state typically referred to as a sleep state. In the sleep state, the user terminal can de-energize portions of the user terminal and may only energize those portions of the user terminal that can be used to quickly transition back to the active state. The sleep state is different from the power down or off state in that the user terminal does not need to perform a complete power up initialization upon return to active state.

The user terminal can transition from the active state to the sleep state automatically, for example, upon sensing inactivity for greater than a predetermined time. The user terminal can periodically awaken in order to maintain the communication link established with the communication system. Alternatively, or additionally, the user terminal can be configured to awaken at predetermined events. For example, the user terminal can periodically awaken from a sleep state in order to receive time domain multiplexed paging messages, or to receive other periodic messages, such as overhead messages. Additionally, the user terminal can awaken from a sleep state upon receipt of user input. The user input can be virtually any user input. For example, the user terminal can awaken from a sleep state as a result of a user attempting to transmit or receive information over the established communication link. The user terminal can also be configured to awaken upon any key activation or combination of key activation.

It can be advantageous for the user terminal to minimize power consumption during the sleep state in order to conserve power, such as battery power. It can also be advantageous for the user terminal to quickly transition from the sleep state to the active state. The combination of low power consumption during sleep state with quick transition to active state allows sleep time and battery power to be maximized.

The user terminal can perform a variety of operations upon transition out of sleep state. For example, the user terminal can energize a Radio Frequency (RF) portion, tune the RF portion to a desired frequency band, and receive one or more messages transmitted over the desired frequency band. Additionally, the user terminal can be configured to synchronize with the received signal in order to recover a desired message.

Figure 1:
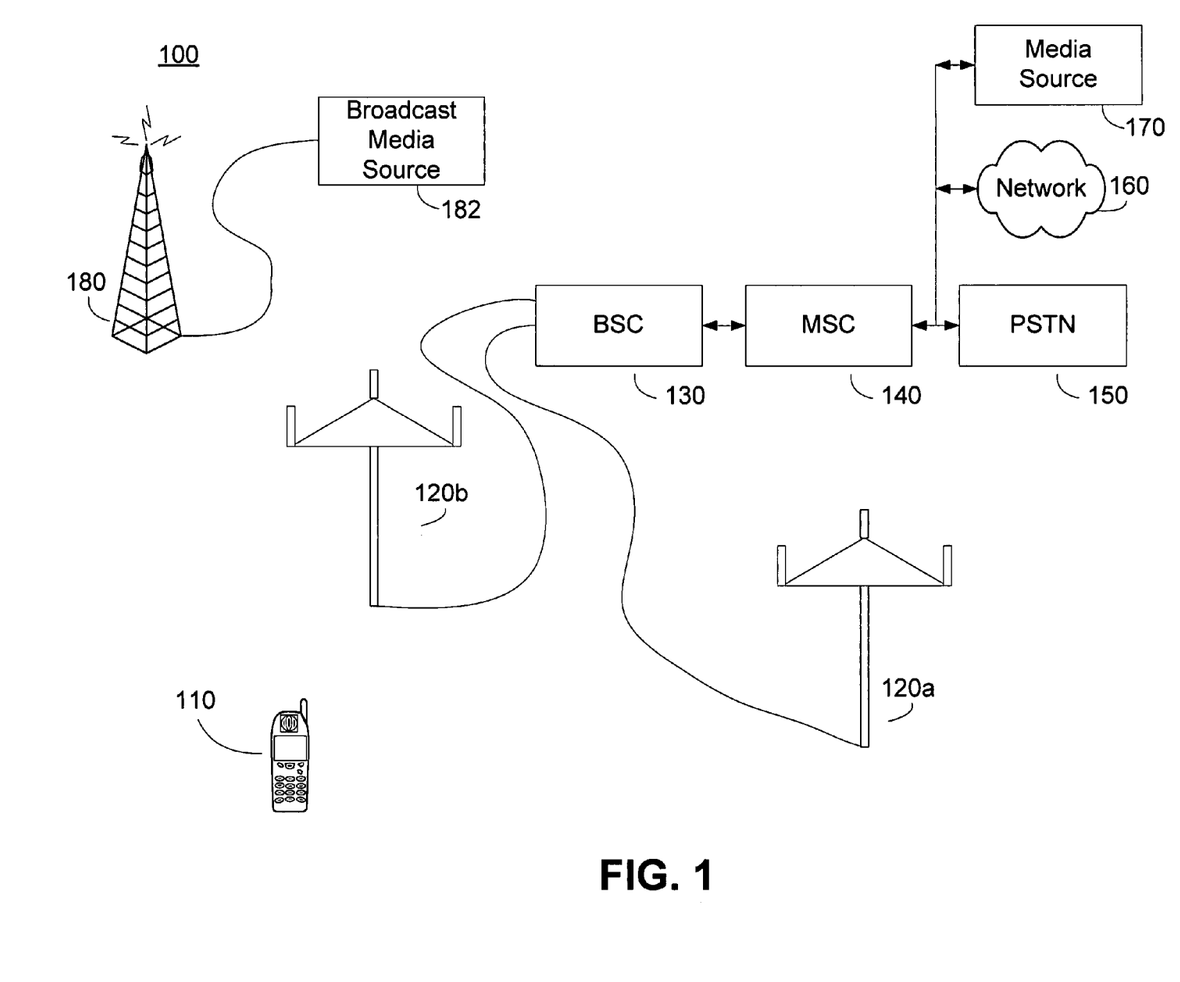
FIG. 1 is a functional block diagram of an embodiment of a wireless communication system.

FIG. 1 is a simplified functional block diagram of an embodiment of a wireless communication system 100. The system includes one or more fixed elements that can be in communication with a user terminal 110. The user terminal 110 can be, for example, a wireless telephone configured to operate according to one or more communication standards. For example, the user terminal 110 can be configured to receive wireless telephone signals from a first communication network and can be configured to receive data and information from a second communication network.

The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110.

Each of the base stations 120a and 120b can be coupled to a Base Station Controller (BSC) 140 that routes the communication signals to and from the appropriate base stations 120a and 120b. The BSC 140 is coupled to a Mobile Switching Center (MSC) 150 that can be configured to operate as an interface between the user terminal 110 and a Public Switched Telephone Network (PSTN) 150. The MSC can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 150 is coupled to the PSTN 150 and network 160. The MSC 150 can also be coupled to one or more media source 170. The media source 170 can be, for example, a library of media offered by a system provider that can be accessed by the user terminal 110. For example, the system provider may provide video or some other form of media that can be accessed on demand by the user terminal 110. The MSC 150 can also be configured to coordinate inter-system handoffs with other communication systems (not shown).

The wireless communication system 100 can also include a broadcast transmitter 180 that is configured to transmit a signal to the user terminal 110. In one embodiment, the broadcast transmitter 180 can be associated with the base stations 120a and 120b. In another embodiment, the broadcast transmitter 180 can be distinct from, and independent of, the wireless telephone system containing the base stations 120a and 120b. The broadcast transmitter 180 can be, but is not limited to, an audio transmitter, a video transmitter, a radio transmitter, a television transmitter, and the like or some combination of transmitters. Although only one broadcast transmitter 180 is shown in the wireless communication system 100, the wireless communication system 100 can be configured to support multiple broadcast transmitters 180.

A plurality of broadcast transmitters 180 can transmit signals in overlapping coverage areas. A user terminal 110 can concurrently receive signals from a plurality of broadcast transmitters 180. The plurality of broadcast transmitters 180 can be configured to broadcast identical, distinct, or similar broadcast signals. For example, a second broadcast transmitter having a coverage area that overlaps the coverage area of the first broadcast transmitter may also broadcast a subset of the information broadcast by a first broadcast transmitter.

The broadcast transmitter 180 can be configured to receive data from a broadcast media source 182 and can be configured to encode the data, modulate a signal based on the encoded data, and broadcast the modulated data to a service area where it can be received by the user terminal 110.

In one embodiment, one or both of the base stations 120a and 120b and the broadcast transmitter 180 transmits an Orthogonal Frequency Division Multiplex (OFDM) signal. The OFDM signals can include a plurality of OFDM symbols modulated to one or more carriers at predetermined operating bands.

An OFDM communication system utilizes OFDM for data and pilot transmission. OFDM is a multi-carrier modulation technique that partitions the overall system bandwidth into multiple (K) orthogonal frequency subbands. These subbands are also called tones, carriers, subcarriers, bins, and frequency channels. With OFDM, each subband is associated with a respective subcarrier that may be modulated with data.

A transmitter in the OFDM system, such as the broadcast transmitter 180, may transmit multiple data streams simultaneously to wireless devices. These data streams may be continuous or bursty in nature, may have fixed or variable data rates, and may use the same or different coding and modulation schemes. The transmitter may also transmit a pilot to assist the wireless devices perform a number of functions such as time synchronization, frequency tracking, channel estimation, and so on. A pilot is a transmission that is known a priori by both a transmitter and a receiver.

The broadcast transmitter 180 can transmit OFDM symbols according to an interlace subband structure. The OFDM interlace structure includes K total subbands, where K>1. U subband's may be used for data and pilot transmission and are called usable subbands, where U<K. The remaining G subbands are not used and are called guard subbands, where G=K−U. As an example, the system may utilize an OFDM structure with K=4096 total subbands, U=4000 usable subbands, and G=96 guard subbands. For simplicity, the following description assumes that all K total subbands are usable and are assigned indices of 0 through K−1, so that U=K and G=0.

The K total subbands may be arranged into M interlaces or non-overlapping subband sets. The M interlaces are non-overlapping or disjoint in that each of the K total subbands belongs to only one interlace. Each interlace contains P subbands, where P=K/M. The P subbands in each interlace may be uniformly distributed across the K total subbands such that consecutive subbands in the interlace are spaced apart by M subbands. For example, interlace 0 may contain subbands 0, M, 2M, and so on, interlace 1 may contain subbands 1, M+1, 2M+1, and so on, and interlace M−1 may contain subbands M−1, 2M−1, 3M−1, and so on. For the exemplary OFDM structure described above with K=4096, M=8 interlaces may be formed, and each interlace may contain P=512 subbands that are evenly spaced apart by eight subbands. The P subbands in each interlace are thus interlaced with the P subbands in each of the other M−1 interlaces.

In general, the broadcast transmitter 180 can implement any OFDM structure with any number of total, usable, and guard subbands. Any number of interlaces may also be formed. Each interlace may contain any number of subbands and any one of the K total subbands. The interlaces may contain the same or different numbers of subbands. For simplicity, much of the following description is for an interlace subband structure with M=8 interlaces and each interlace containing P=512 uniformly distributed subbands. This subband structure provides several advantages. First, frequency diversity is achieved since each interlace contains subbands taken from across the entire system bandwidth. Second, a wireless device can recover data or pilot sent on a given interlace by performing a partial P-point fast Fourier transform (FFT) instead of a full K-point FFT, which can simplify the processing at the wireless device.

The broadcast transmitter 180 may transmit a frequency division multiplexed (FDM) pilot on one or more interlaces to allow the wireless devices to perform various functions such as channel estimation, frequency tracking, time tracking, and so on. The pilot is made up modulation symbols that are known a priori by both the base station and the wireless devices, which are also called pilot symbols. The user terminal 110 can estimate the frequency response of a wireless channel based on the received pilot symbols and the known transmitted pilot symbols. The user terminal 110 is able to sample the frequency spectrum of the wireless channel at each subband used for pilot transmission.

The system 100 can define M slots in the OFDM system to facilitate the mapping of data streams to interlaces. Each slot may be viewed as a transmission unit or a mean for sending data or pilot. A slot used for data is called a data slot, and a slot used for pilot is called a pilot slot. The M slots may be assigned indices 0 through M−1. Slot 0 may be used for pilot, and slots 1 through M−1 may be used for data. The data streams may be sent on slots 1 through M−1. The use of slots with fixed indices can simplify the allocation of slots to data streams. Each slot may be mapped to one interlace in one time interval. The M slots may be mapped to different ones of the M interlaces in different time intervals based on any slot-to-interlace mapping scheme that can achieve frequency diversity and good channel estimation and detection performance. In general, a time interval may span one or multiple symbol periods. The following description assumes that a time interval spans one symbol period.

Various slot-to-interlace mapping schemes may be used to map the M slots to the M interlaces. A first slot-to-interlace mapping scheme may be implemented as follows. The eight interlaces are represented by an original sequence of $\{I_0, I_1, I_2, I_3, I_4, I_5, I_6, I_7\}$. A permutated sequence of $\{I_0, I_4, I_2, I_6, I_1, I_5, I_3, I_7\}$ is formed by placing each interlace in the original sequence in the bit-reverse location in the permutated sequence. A shortened sequence of $\{I_0, I_4, I_{2/6}, I_1, I_5, I_3, I_7\}$ is then formed by combining the two interlaces used for pilot. The pilot is transmitted on either interlace 2 or 6 in each symbol period. Data is transmitted on the interlace that is not used for the pilot, which is either interlace 6 or 2 and is denoted as $I_{2/6}$ in the shortened sequence. Data slot m for $m \in \{1 \ldots 7\}$ is then mapped to the m-th interlace in the shortened sequence. For each symbol period thereafter, the shortened sequence is circularly shifted to the right by two positions and wraps around to the left. Data slot m is again mapped to the m-th interlace in the circularly shifted shortened sequence.

Figure 6:
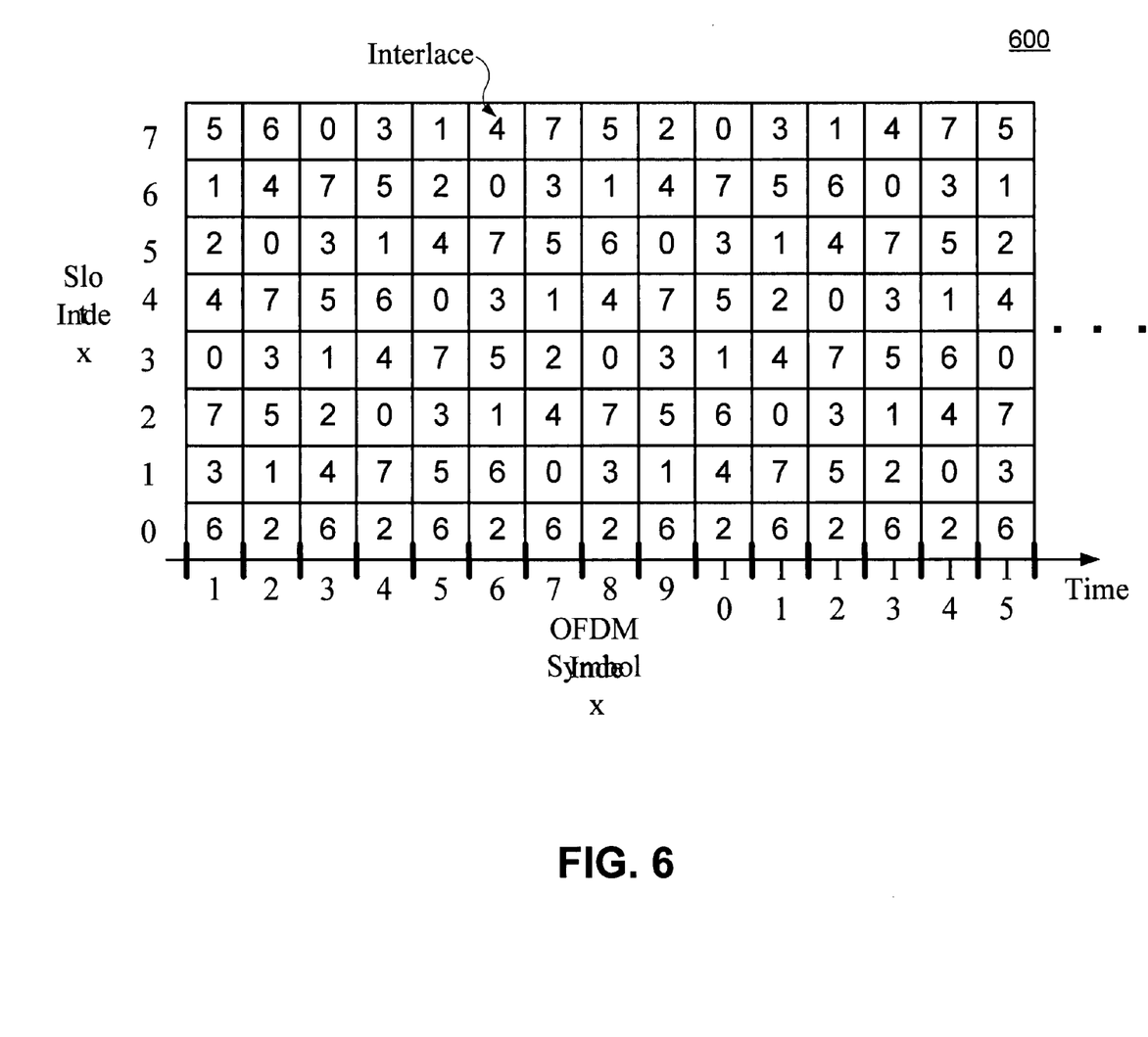
FIG. 6 is an example of a slot to interlace map for an OFDM system.

FIG. 6 shows a slot to interlace mapping 600 for the first slot-to-interlace mapping scheme described above. Pilot slot 0 is mapped to interlaces 2 and 6 on alternating symbol periods. Data slots 1 through 7 are mapped to the seven interlaces in the shortened sequence $\{I_0, I_4, I_{2/6}, I_1, I_5, I_3, I_7\}$ in a symbol period (symbol index 7 or 14), then to the circularly shifted shortened sequence $\{I_3, I_7, I_0, I_4, I_{2/6}, I_1, I_5\}$ in the next symbol period, and so on.

The transmitted signal is organized into superframes. Each superframe has duration $T_{SF}$ equal to 1 s, and consists of 1200 OFDM symbols. The OFDM symbols in a superframe are numbered 0 through 1199. The OFDM symbol interval $T_S$ is 833.33 µs. The OFDM symbol consists of a number of time-domain baseband samples, called OFDM chips. These chips are transmitted at a rate of $5.55 \times 10^6$ per second.

In the wireless communication system 100, the smallest unit of bandwidth allocated to a logical channel over an OFDM symbol corresponds to a group of approximately 512 constellation symbols. This group of approximately 512 constellation symbols is called a slot.

There are 8 slots during every OFDM symbol. These slots are numbered 0 through 7. A scheduler function (in the MAC layer) allocates slots during the data portion of the superframe. When the scheduler function allocates bandwidth to a logical channel for transmission over an OFDM symbol, it does so in integer units of slots. Each slot is transmitted over an interlace. The mapping from slots to interlaces varies from OFDM symbol to OFDM symbol.

In the example of the slot to interlace map 600 shown in FIG. 6, the pilot signal is assigned to a particular slot, for example slot 0, and data streams can be assigned to one of the remaining seven slots. The pilot slot is alternately assigned to one of interlaces two or six. The mapping of each data slot to interlace repeats after 14 symbols. If the wireless communication system 100 implements the slot to interlace map 600 shown in FIG. 6, the user terminal 110 can determine the interlaces corresponding to assigned data slot once the position within the repeating sequence is determined.

In one embodiment, the broadcast transmitter 180 can be configured to transmit OFDM data according to the slot to interlace map 600. The OFDM symbols can be organized in a superframe of 1200 symbols. Each symbol in the superframe includes a symbol index, referred to as a symbol number, that ranges from an index value of 0 through 1199.

A user terminal 110 can be assigned to one or more data slots. The user terminal 110 uses the symbol number in order to synchronize with the received OFDM signal and determine which interlaces correspond to the assigned slot. Because the data slots cycle through the different interlace patterns of the slot to interlace map 600 every fourteen symbols, the user terminal 110 can determine the interlace corresponding to the assigned data slots by computing the slot index modulo-14. The user terminal 110 can look up the interlace assignment based on the modulo-14 slot index and the slot assignment.

The user terminal 110 can initially synchronize with the symbols in a received superframe and increment a modulo-14 counter for as it receives OFDM symbols. Each OFDM symbol can span a substantially identical period of time. Thus, the user terminal 110 can increment the modulo-14 symbol index counter based on a predetermined time, information received with each OFDM symbol, or a combination of time and received information.

If the user terminal 110 is capable of transitioning to a sleep state, the user terminal 110 needs to track or otherwise determine the interlace information upon transitioning back to an active state. When the user terminal 110 transitions from the sleep state back to an active state, the user terminal 110 can determine the interlaces corresponding to its assigned data slots by performing a modulo-14 operation on the received symbol number. The modulo-14 symbol number can be used in conjunction with the slot to interlace map 600 to determine the corresponding one or more data interlaces.

The user terminal 110 can determine the modulo-14 symbol number upon wake up in any of a variety of ways. In an embodiment, a 4 bit counter is incremented upon receiving every new symbol. The counter can be incremented based on a clock that coincides with the symbol period.

The 4 bit counter is reset when the count reaches 14 (not allowing it to progress to 15 or 16). However, if the clock to the counter is stopped during sleep operation, the count will likely be incorrect when the clock is restarted. So, one embodiment is to supply a clock signal to this counter at all times. However, supplying the clock signal to the 4 bit counter during the sleep period unnecessarily consumes extra power. The user terminal 110, by definition, does not actively receive and process symbols in the sleep state.

In another embodiment, a user terminal performs a modulo-14 operation on a symbol received upon waking up from sleep to properly select a slot to perform interlace mapping Modulo-14 math is not a power of two, so additional hardware is required beyond shift registers to perform the operation.

Figure 2:
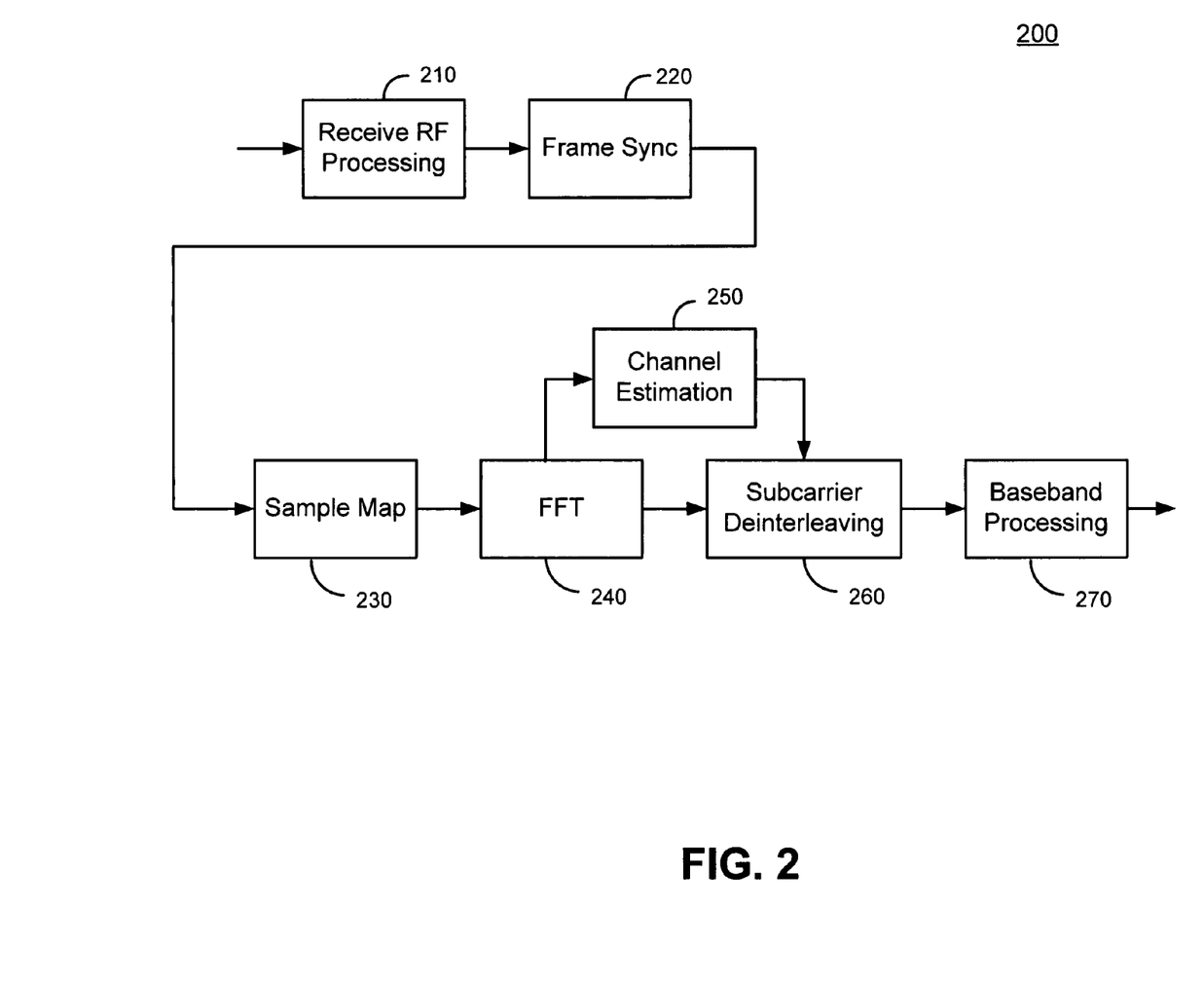
FIG. 2 is a simplified functional block diagram of an embodiment of a sleep capable receiver configured to determine a modulo count.

FIG. 2 is a simplified functional block diagram of an OFDM receiver 200 that can be implemented, for example, in the user terminal of FIG. 1. The receiver 200 can be configured to selectively transition from an active state into a sleep state and back to the active state. The duration of the sleep state can be an arbitrary length, and as such, the symbol number of the symbol received upon awakening can be any umber within the allowable range of symbol numbers.

The receiver 200 includes a receiver RF processor 210 configured to receive the transmitted RF OFDM symbols over an RF channel, process them and frequency convert them to baseband OFDM symbols or substantially baseband signals. A signal can be referred to as substantially a baseband signal if the frequency offset from a baseband signal is a fraction of the signal bandwidth or if the signal is at a sufficiently low intermediate frequency to allow direct processing of the signal without further frequency conversion. The OFDM symbols from the receive RF processor 210 are coupled to a frame synchronizer 220. The frame synchronizer 220 can be configured to synchronize the receiver 200 with the symbol timing. In an embodiment, the frame synchronizer can be configured to synchronize the receiver to the superframe timing and to the symbol timing within the superframe. In an embodiment, the frame synchronizer 220 initializes a symbol counter at the beginning of each superframe and the count value can represent the symbol number within the superframe.

The frame synchronizer 220 can be configured to determine the modulo-14 symbol index from the symbol count. The receiver 200 can use the modulo-14 symbol count to determine the pilot interlace as well as the one or more interlaces corresponding to assigned data slots.

The frame synchronizer 220 can synchronize the receiver timing based on a number of factors and using any of a number of techniques. For example, the frame synchronizer 220 can demodulate the OFDM symbols and can determine the superframe timing from the demodulated symbols. In another embodiment, the frame synchronizer 220 can determine the superframe timing based on information received within one or more symbols, for example, in an overhead channel. In another embodiment, the frame synchronizer 220 can synchronize the receiver 200 by receiving information over a distinct channel, such as by demodulating an overhead channel that is received distinct from the OFDM symbols. Of course, the frame synchronizer 220 can use any manner of achieving synchronization, and the manner of achieving synchronization does not necessarily limit the manner of determining the modulo symbol count.

The output of the frame synchronizer 220 is coupled to a sample map 230 that can be configured to demodulate the OFDM symbol and map the symbol samples or chips from a serial data path to any one of a plurality of parallel data paths. For example, the sample map 220 can be configured to map each of the OFDM chips to one of a plurality of parallel data paths corresponding to the number of subbands or subcarriers in the OFDM system.

The output of the sample map 230 is coupled to an FFT module 240 that is configured to transform the OFDM symbols to the corresponding frequency domain subbands. The FFT module 240 can be configured to determine the interlace corresponding to the pilot slot based on the modulo-14 symbol count. The FFT module 240 can be configured to couple one or more subbands, such as predetermined pilot subbands, to a channel estimator 250. The pilot subbands can be, for example, one or more equally spaced sets of OFDM subbands spanning the bandwidth of the OFDM symbol.

The channel estimator 250 is configured to use the pilot subbands to estimate the various channels that have an effect on the received OFDM symbols. In one embodiment, the channel estimator 250 can be configured to determine a channel estimate corresponding to each of the data subbands.

The subbands from the FFT module 2400 and the channel estimates are coupled to a subcarrier symbol deinterleaver 260. The symbol deinterleaver 260 can be configured to determine the interlaces based on knowledge of the one or more assigned data slots and the modulo-14 symbol count.

The symbol deinterleaver 260 can be configured, for example, to demodulate each of the subcarriers corresponding to the assigned data interlace and generate a serial data stream from the demodulated data. In another embodiment, the symbol deinterleaver 260 can be configured to demodulate each of the subcarriers corresponding to the assigned data interlace and generate a parallel data stream. In yet another embodiment, the symbol deinterleaver 260 can be configured to generate a parallel data stream of the data interlaces corresponding to the assigned slots.

The output of the symbol deinterleaver 260 is coupled to a baseband processor 270 configured to further process the received data. For example, the baseband processor 270 can be configured to process the received data into a multimedia data stream having audio and video. The baseband processor 270 can send the processed signals to one or more output devices (not shown).

Figure 3:
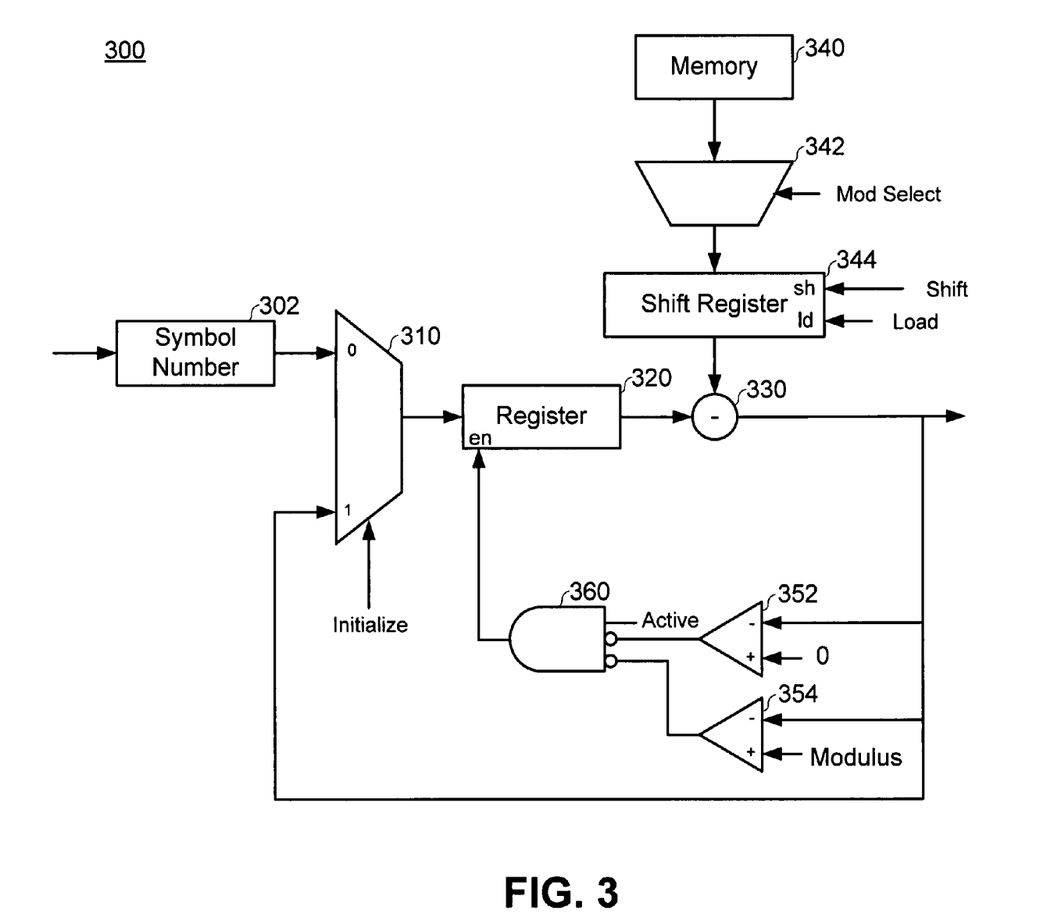
FIG. 3 is a simplified functional block diagram of an embodiment of a modulo processor.

FIG. 3 is a simplified functional block diagram of an embodiment of a modulo processor 300. The modulo processor 300 can be configured to perform a modulo operation on an input value. The modulo processor 300 can be configured, for example, within the frame synchronizer of the receiver of FIG. 2, and can be configured to determine the modulo-14 symbol index used in slot to interlace mapping.

The modulo processor 300 can be configured to determine a modulo operation on an input value, where the modulus is selected from a plurality of modulo. The modulo processor 300 can be particularly advantageous where the modulus is not a power of two.

The modulo processor 300 includes a number memory 302 used to store the input value on which the modulo operation is to be performed. The input value can be configured to lie within a predetermined range of values. In one embodiment, the number of bits used to represent the number determines the predetermined range of values. Thus a 12-bit number can represent at most a value of 4095. Similarly, an 11-bit number can represent a maximum value of 2047, and a 10-bit number can represent a maximum value of 1023.

In another embodiment, the predetermined range is a subset of the maximum range defined by the number of bits in memory. For example, the number memory 302 can be an 11-bit number, but the predetermined maximum number may be 1199, which is less than the maximum number that can be represented by an 11-bit number. The predetermined maximum number is either known or is assumed to be the maximum number that can be represented by the number memory 302 or some other register or memory within the modulo processor 300.

The number memory 302 couples the number to a first input of a first multiplexer 310. The first multiplexer 310 is configured to selectively couple one of at least two input values to a multiplexer output. As described earlier, the first input is the number stored in the number memory 302. The second input is a number derived from the number stored in number memory 302, as described below.

A control signal coupled to the control input of the first multiplexer 310 is configured to select the multiplexer output from the first or second multiplexer input. The control signal can be configured to select the first multiplexer input on a first cycle of the modulo operation and select the second multiplexer input for subsequent cycles of the modulo operation.

The output of the first multiplexer 310 is coupled to a register 320 that is configured to register or otherwise store the value output by the first multiplexer 310. The output of the register 320 is coupled to a first input of a subtractor 330.

The value coupled to a second input of the subtractor 330 is a number generated based at least in part on the modulus, $M_{mod}$. A modulus memory 340 can be configured to store a plurality of values corresponding to a plurality of modulus values. For each modulus, $M_{mod}$, the modulus memory 340 stores the largest positive power of two multiple of the modulus that can be represented by the input number. For example, for each modulus, the modulus memory 340 stores the maximum value of $M_{mod} \times 2^P$ that can be stored in the number memory 302.

The modulus memory 340 can couple each of the stored values to a distinct input of a second multiplexer 342. A modulus select signal coupled to the control input of the second multiplexer 342 determines which of the stored values, and thus which of the plurality of moduli, to couple to the output.

The output of the second multiplexer 342, corresponding to the largest power of two multiple of the modulus that can be represented by the input number, is coupled to a shift register 344. A control signal coupled to the load input of the shift register 344 loads the initial value into the shift register 344 prior to commencement of the modulo operation.

The shift register 344 couples the registered value to the second input of the subtractor 330. Initially, the shift register 344 couples the largest power of two multiple of the modulus that can be represented by the input number to the second input of the subtractor 344.

The modulo processor 300 can perform the modulo operation in a maximum of P cycles, where P represents the power of two used to determine the maximum power of two multiple of the modulus stored in modulus memory 340. Each cycle is described in further detail below.

The subtractor 330 determines the difference of the shift register 344 value from the register 320 value. The difference is coupled to two comparators 352 and 354 and is also coupled to the second input of the first multiplexer 310.

A first comparator 352 compares the difference to zero and determines if the difference is less than zero. The second comparator 354 compares the difference to the modulus and determines if the difference is less than the modulus.

If the difference is less than the modulus and is not negative, then it is greater than or equal to zero. The modulo operation is complete and the difference represents the input value modulo-$M_{mod}$.

If the difference is greater than zero and greater than the modulus, the register 320 loads the difference. The shift register 344 shifts the stored value right one bit, thereby dividing the value by two. The next cycle of the modulo operation is performed using the new register value and the new shift register value.

If the difference is less than zero, the difference is not loaded into the register 320. Instead, the register value 320 from the previous cycle remains in the register 320. The shift register 344 shifts the stored value right one bit, thereby dividing the value by two. The next cycle of the modulo operation is performed using the prior register value and the new shift register value.

The modulo operation continues to compute differences and reloads the register 320 based on the results of the difference at the end of each cycle. Additionally, the shift register 344 shifts the stored value right one bit at the conclusion of each cycle. The modulo operation continues until the difference is zero or a positive value less than the modulus.

The modulo processor 300 performs a modified binary search based on the modulus. Because the search is a modified binary search, the modulo processor 300 is guaranteed to converge on the result in less than or equal to P cycles, where P correspond to the power of two used to determine the power of two multiple of the modulus.

Figure 4:
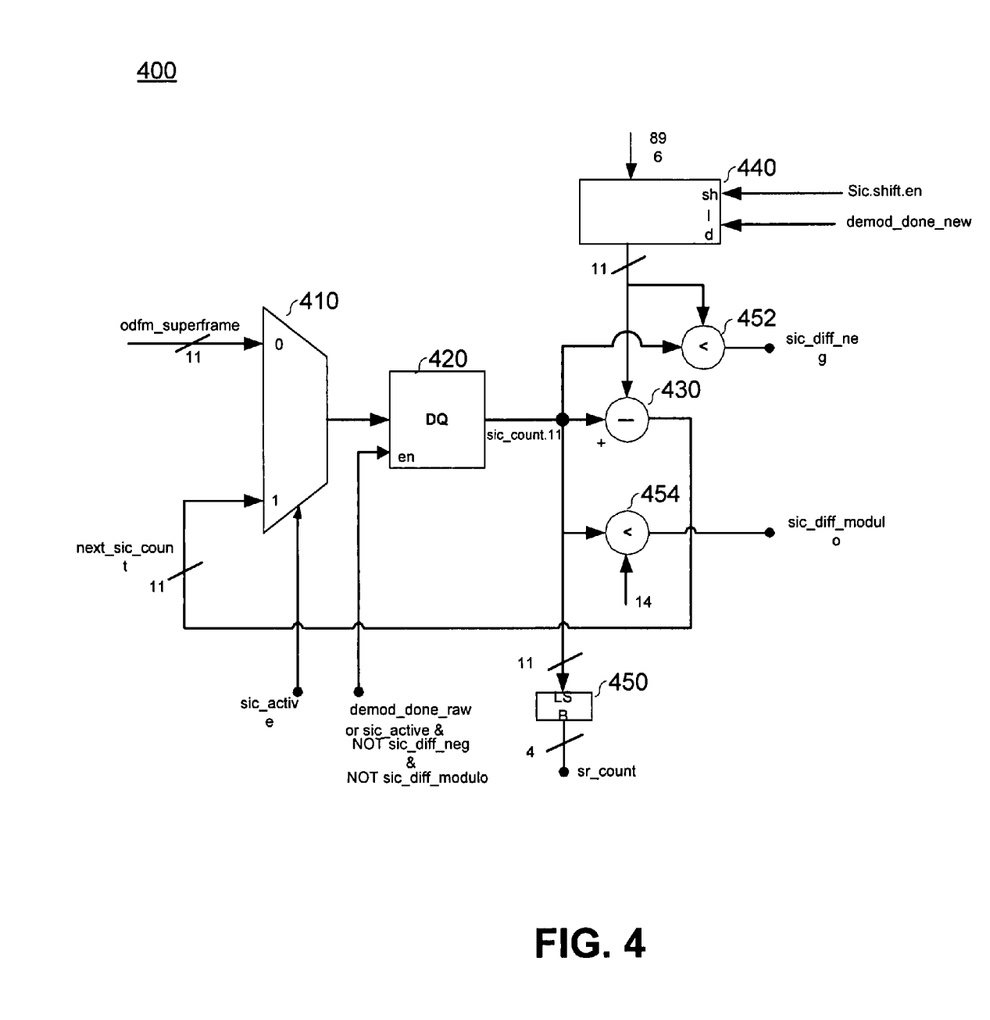
FIG. 4 is a simplified functional block diagram of an embodiment of a modulo processor.

FIG. 4 is a simplified functional block diagram of an embodiment of a modulo processor 400 configured to perform a modulo-14 operation on a superframe symbol number of the OFDM system described above in relation to FIG. 1. The modulo processor 400 can be implemented in the receiver of FIG. 2.

As described earlier, the superframe symbol number ranges from 0-1199, and the interlace map repeats after every 14 OFDM symbols. The receiver may be commanded into sleep mode, and awaken a random number of symbols (time) later. Upon wake up, the modulo-14 operation needs to be performed quickly and efficiently. In the embodiment shown in FIG. 4; the modulo-14 operation is performed within seven cycles of a wake up signal. By only using the superframe symbol number, the receiver can have its clock frozen for sleep operation and still quickly determine an accurate value for the slot to interlace mapping function without requiring hardware to be running during sleep periods.

The modulo processor 400 embodiment of FIG. 4 performs a modified binary search of the symbol number. An effective binary search can be implemented to determine the modulo 14 value in accordance with an embodiment using a register, shift register, subtractor, and two comparators.

The symbol number for a superframe is loaded from a multiplexer 410 into a register 420. The register 420 can be, for example, configured as one or more D flip-flops. In an embodiment, the range of the symbol number is from zero to 1199. The shift register 440 is loaded with the value 896 (14×64) in accordance with an embodiment.

In the embodiment of FIG. 4, the modulo processor 400 is configured to perform a modulo-14 operation. The modulo processor 400 can be configured for a single modulus, or the selection of the modulus can be performed as in the embodiment of FIG. 3.

The register 420 and shift register 440 couple their respective outputs to a subtractor 430. A first comparator 452 coupled to the register 420 and the shift register 440 determines if the difference is negative. If the difference between the register value and the shift register value is equal to or greater than zero (0), the difference is loaded into the register 420, replacing the value from the prior cycle. If the difference is less than zero (0), the difference is not loaded into the register 420.

Every cycle, the shift register 440 is right shifted, effectively dividing the subtrahand by 2. For example, at the end of the first cycle the right shift reduces the subtrahand from 896 to 448. At the end of each subsequent cycle, the shift register value is divided by to until the subtrahand equals the modulus, 14.

The second comparator 454 determines if the difference is less than the modulus of fourteen. The second comparator 454 has a first input coupled to the register 420 and has the modulus value coupled to a second input. If at any time the difference is between 0 and 13, the process is stopped and the difference value is sent to a slot to interlace mapper to properly determine the interlaces corresponding to the assigned slots and to decode the data for that symbol.

The output of the register 420 is also coupled to a 4-bit register 450. When the output of the second comparator 454 is between a lower limit (zero) and an upper limit (modulus-1), the 4-bit register 450 is configured to store the result of the modulo operation at the next cycle. A register is not required to store or otherwise couple the result of the modulo operation. In other embodiments, the 4-bit register 450 can be replaced with a storage device, memory, register, or combination thereof, and the like, or some other means for storing the four least significant bits of the difference value. In another embodiment, the 4-bit register 450 can be replaced with combinatorial logic if the result of the modulus operation does not need to be stored or otherwise registered.

When all samples for a symbol have been received and demodulated, the enable input to the register is pulsed high, and the current symbol number is registered. The load control signal to the shift register is pulsed high and the shift register 440 is loaded with the value 896.

The registered multiplexer output value is coupled to an input of the subtractor 430 as is the shift register 440 value. The difference between the register output and the shift register value is the subtractor 430 output. The difference is only loaded into the register 420 for the next cycle of the modulo processor 400 if it is not negative. The shift register 440 shift control signal, (sic.shift.en) is enabled causing the shift register value to be effectively divided by two for the next cycle's calculations.

The second comparator 454 compares the difference to the modulus, 14. When the difference (sic.count.11) is positive and less than 14, the circuit stops. Sic.count is the four least significant bits (LSB's) of the difference (sic.count.11) and is clocked into the 4-bit register 450 at the next clock cycle.

Figure 5:
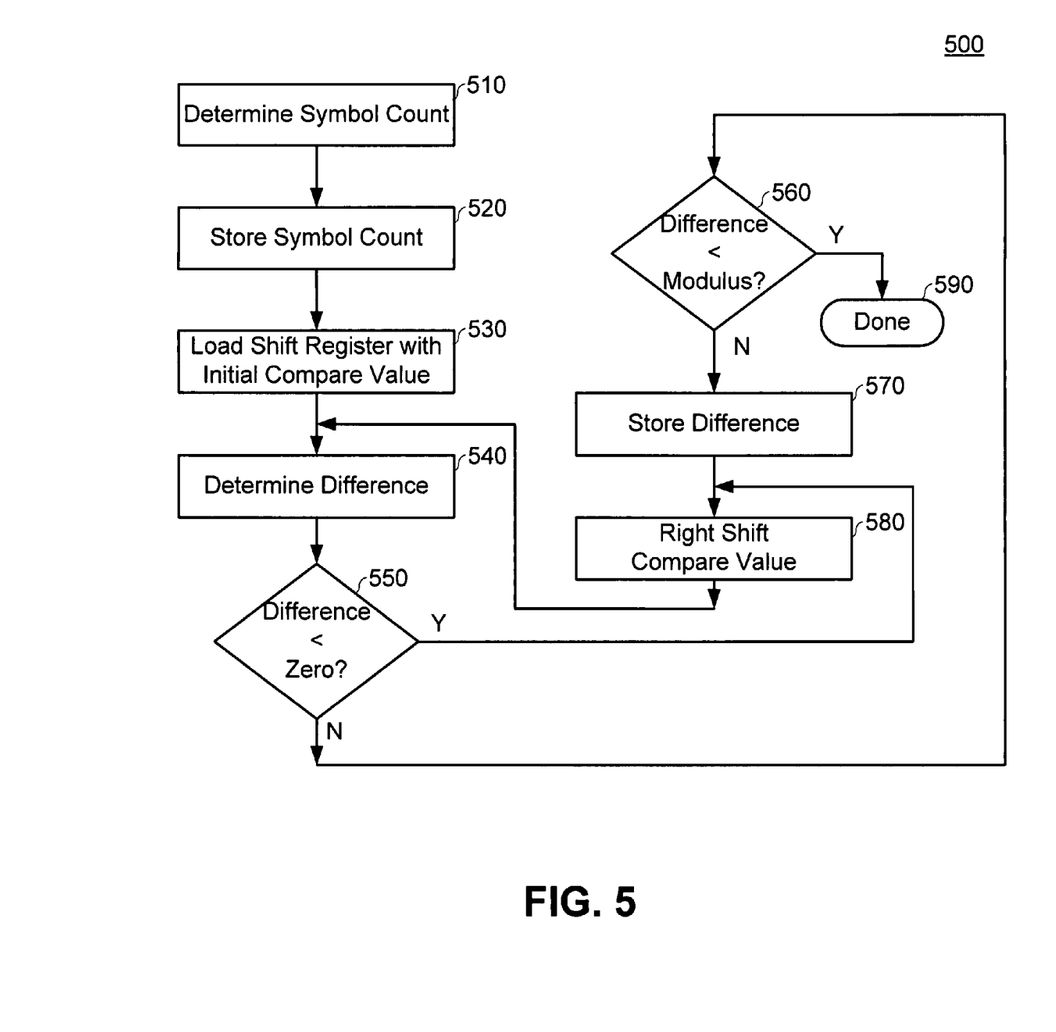
FIG. 5 is a simplified flowchart of a method of determining a modulo count in a sleep capable system.

FIG. 5 is a simplified flowchart of an embodiment of a method 500 of performing a modulo operation on an input value. The method 500 can be performed, for example, by the receiver of FIG. 2, or the modulo processors of FIG. 3 or 4.

The method 500 begins at block 510 where the modulo processor determines a symbol count. For example, the modulo processor can determine a symbol count by synchronizing with a superframe boundary and counting the number of OFDM symbols from the boundary. In another embodiment, the modulo processor can determine the symbol count by demodulating the OFDM symbol and determining the symbol count from the received signal. Other modulo processors can have other methods of determining or otherwise obtaining the symbol count. Other embodiments may perform a modulo operation on a value other than symbol count, and thus, may use some other method of determining an input value on which to perform the modulo operation.

The symbol count can have a predetermined maximum value, or a maximum value can be assumed from the number of bits used to represent the number. In the example of an OFDM symbol count, the maximum symbol count can be 1199.

The modulo processor proceeds to block 520 and stores the symbol count. For example, the symbol count can be coupled to a multiplexer, and the modulo processor can select the symbol count from the multiplexer input and store the value in a register.

The modulo processor proceeds to block 530 and loads a shift register with an initial comparison value. The modulo processor can determine an initial comparison value from a plurality of distinct comparison values, each corresponding to a distinct modulus. In another embodiment, an initial comparison value corresponding to a single modulus can be stored in memory and loaded into a shift register.

The initial comparison value can be determined or otherwise selected to be the maximum power of two multiple of the modulus that is less than the maximum symbol count value.

The modulo processor performs a modified binary search of the symbol value when performing the modulo operation. The modulo search is a true binary search if the initial comparison value is exactly the middle of the maximum symbol count and the modulus is two.

The modulo processor performs a number of cycles or loops in determining the modulo value. Block 540 represents the beginning of each loop. At block 540, the modulo processor subtracts the shift register value from the registered value and determines the difference. In the initial cycle, the modulo processor subtracts the initial comparison value from the symbol count.

The modulo processor proceeds to decision block 550 and determines if the difference is less than zero. If so, the modulo processor proceeds to block 580, right shifts the comparison value stored in the shift register and returns to block 540 for the next cycle. The shift register holds one half the initial comparison value for the second cycle, one fourth the initial comparison value for the third cycle, one eighth the initial comparison value for the fourth cycle, etc. until the final cycle, where the shift register holds the modulus. The modulo processor can terminate the modulo process before the final cycle if the operation converges on the value earlier.

The right shift of the comparison value divides the value by two without the use of a divider circuit, such as a hardware divider. The initial comparison value is a multiple of a power of two, thus ensuring that each right shifted comparison value results in a whole number.

Returning to decision block 550, if the modulo processor determines that the difference is not less than zero, the modulo processor proceeds to decision block 560 and determines if the difference is less than the modulus. If the difference is less than the modulus, the modulo operation is done, and the modulo processor proceeds to block 590. The difference represents the result of the modulo operation.

If, at decision block 560, the modulo processor determines that the difference is not less than the modulus, the modulo processor proceeds to block 570. The modulo processor stores the difference in the register for use in the next cycle.

The modulo processor proceeds to block 580 to right shift the shift register value. The modulo processor then returns to block 540 to perform the next cycle of the modulo operation.

Table 1 represents an example of the various register and difference values after each cycle of the modulo processor using a maximum symbol count of 1199, an initial symbol count of 1107, an initial comparison value of 896, and a modulus of 14. The initial comparison value ($896=2^6 \times 14$) represents the largest power of two multiple of the modulus that is less than the maximum symbol count.

TABLE 1

| Cycle | Register | Shift Register | Difference |
|---|---|---|---|
| 0 | 1107 | 896 | 211 |
| 1 | 211 | 448 | −237 |
| 2 | 211 | 224 | −13 |
| 3 | 211 | 112 | 99 |
| 4 | 99 | 56 | 43 |
| 5 | 43 | 28 | 15 |
| 6 | 15 | 14 | 1 |

Table 1 shows that the modulo processor will converge the modulo operation to a solution within seven cycles. Some initial count values will converge in fewer than seven total cycles. In some embodiments, the modulo processor can be configured to operate for seven cycles without regard to earlier convergence. The result obtained at the conclusion of the seventh cycle will represent the result of the modulo operation, and intermediate checking of the difference relative to the modulus may be omitted.

Figure 7:
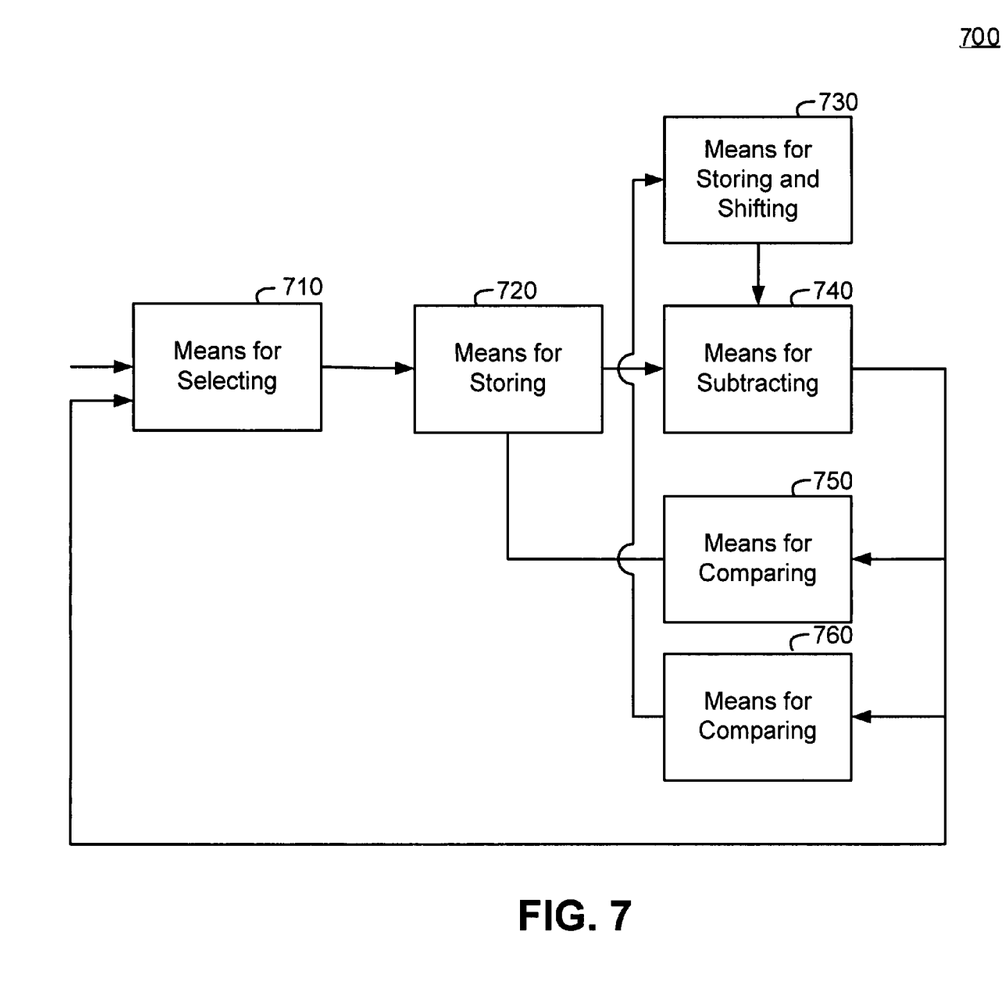
FIG. 7 is a simplified functional block diagram of an embodiment of a modulo processor.

FIG. 7 is a simplified functional block diagram of a modulo processor 700. The modulo processor 700 includes a means for selecting one of a plurality of inputs for coupling to an output. The inputs can include an initial value and a difference value. The means for selecting one of a plurality of input values can be configured to select the initial value on a first cycle of the modulo processor 700, and can be configured to select the difference value for subsequent cycles.

The means for selecting one of a plurality of inputs 710 can be configured in any one of a variety of ways. For example, the means for selecting one of a plurality of inputs 710 can be or include, a multiplexer, memory and logic devices, combinatorial logic devices, and the like.

A means for storing one of the initial value or the difference value 720 can be coupled the means for selecting one of a plurality of inputs. The means for storing one of the initial value or the difference value 720 can include one or more storage devices, one or more memory locations, one or more registers, one or more D flip-flops, and the like.

A means for storing a comparison value 730 can also be configured as a means for shifting the comparison value. The initial comparison value can be selected to be the largest power of two multiple of a modulus. The means for storing the comparison value 730 can include a shift register, one or more storage devices, one or more memory locations, memory in conjunction with combinatorial logic, and the like.

A means for subtracting 740 is coupled to the means for storing one of the initial value or the difference value and the means for storing the comparison value. The means for subtracting 740 can be configured to subtract the comparison value from the initial value or difference value, depending on the cycle of the modulo processor 700. The result of the subtraction is an update of the difference value. The means for subtracting 740 can include a subtractor, an adder and twos complement module, a sign inverter and adder, and the like.

A first means for comparing 750 can be coupled to the means for subtracting 740 and can be configured to compare the difference value to zero and determine if the difference value is less than zero. If the difference value is less than zero, the first means for comparing 750 can be configured to cause the means for storing one of the initial value or the difference value 720 to store the newly determined difference value for a subsequent cycle of the modulo processor 700. If the difference value is not less than zero, the first means for comparing 750 can be configured to allow the value in the means for storing one of the initial value or the difference value 720 to remain unchanged. The first means for comparing 750 can include a comparator, a subtractor, a thresholder, and the like.

A second means for comparing 760 can be coupled to the means for subtracting 740 and can be configured to compare the difference value to a modulus value. If the difference is less than the modulus value, the modulo processor 700 is done and the difference value represents the modulo value.

If the difference value is not less than the modulus value, the second means for comparing 760 can be configured to cause the means for storing the comparison value 730 to right shift the comparison value, effectively dividing the comparison value by two. The second means for comparing 760 can include a comparator, a subtractor, a thresholder, and the like.

Apparatus and methods for performing a modulo operation quickly, efficiently and cost effectively have been described herein. The apparatus and methods can perform a modulo operation without the need for expensive dividers, or without the need to constantly energize a modulo counter during sleep period. The described modulo processors, and the methods for performing a modulo operation, can be configured to converge to a solution within a predetermined number of cycles. The predetermined number of cycles can be less than or equal to an exponent of the largest power of two that can be multiplied by the modulus and remain less than a maximum value input to the modulo processor.

The modulo operation includes a multiplexer configured to select one of an initial value or a difference value. A register can be configured to store the value selected by the multiplexer or can be configured to leave a previously stored value unaltered.

A shift register can be configured to initially load a comparison value equal to a largest power of two multiple of the modulus that is less than a maximum input value. A subtractor can subtract the comparison value from the registered value to generate a difference or difference value.

If the difference value is less than the modulus, the operation is done. If the difference value is greater than the modulus, the comparison value is right shifted to divide the value by two. If the difference value is greater than zero, the register is updated with the difference value, else the value in the register remains unchanged.

The subtraction and comparison operations are repeated in subsequent cycles until the difference value is less than the modulus.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of performing a modulo operation, the method comprising:
   generating, using a processor, a difference value based in part on a stored value based on an initial input stored value and a shift register value, wherein the shift register value is based on a modulus;
   determining, using the processor, whether the difference value is less than the modulus; and
   outputting, using the processor, the difference value as a modulo value of the initial input stored value when the difference value is less than the modulus, wherein the modulo value is based on the modulus.

2. The method of claim 1, further comprising:
   determining whether the difference value is a negative value, and updating the stored value if the difference value is not negative; and
   shifting the shift register value; and
   determining an updated difference value.

3. The method of claim 1, wherein generating the difference value comprises determining a difference by subtracting the shift register value from the stored value.

4. The method of claim 1, wherein the shift register value is a power of two multiple of the modulus.

5. The method of claim 1, wherein an initial shift register value is a largest power of two multiple of the modulus that is less than a maximum stored value.

6. The method of claim 1, wherein shifting the shift register value comprises right shifting the shift register value by one bit.

7. A method of performing a modulo operation, the method comprising:
   (a) storing an initial input value in a first register;
   (b) storing an initial comparison value in a second register;
   (c) determining a difference by subtracting the second register value from the first value;
   (d) determining if the difference is less than zero;
   (e) storing the difference in the first register if the difference is not less than zero;
   (f) dividing the second register value by two and storing the result in the second register;
   (g) repeating at least a portion of (c) through (f) until the difference is less than a modulus value; and
   (h) outputting the difference as a modulo value of the initial input value when the difference is less than the modulus value, wherein the modulo value is based on the modulus value.

8. The method of claim 7, wherein storing the initial value in the first register comprises: receiving the initial value at a first input of a multiplexer;
   selecting the initial value to output from the multiplexer; and
   clocking the initial value into the first register.

9. The method of claim 7, wherein storing the initial value in the first register comprises storing a symbol number corresponding to a received Orthogonal Frequency Division Multiplex (OFDM) symbol.

10. The method of claim 7, wherein storing the initial comparison value comprises loading a shift register with the initial comparison value.

11. The method of claim 10, wherein dividing the second register value by two comprises right shifting the shift register.

12. The method of claim 7, wherein storing the initial comparison value comprises loading a shift register with a largest power of two multiple of the modulus that is less than a maximum initial value.

13. The method of claim 12, wherein the maximum initial value comprises a predetermined maximum value.

14. The method of claim 12, wherein the maximum initial value comprises a maximum value that can be represented by bits of the first register.

15. A method of performing a modulo operation, the method comprising:
   storing an initial number as a value in a first register;
   loading a shift register with an initial comparison value;
   subtracting a value in the shift register from the value in the first register to obtain a difference value;
   determining if the difference value is less than a modulus; and
   if the difference value is not less than the modulus, repeating a process cycle until the difference value is less than the modulus, the process cycle comprising:
      determining if the difference value is less than zero;
      storing the difference value in the first register if the difference value is not less than zero;
      right shifting the shift register;
      subtracting the value in the shift register from the value in the first register to update the difference value;
      determining if the difference value is less than the modulus; and
   outputting the difference value as a modulo value of the initial number when the difference is less than the modulus, wherein the modulo value is based on the modulus value.

16. The method of claim 15, wherein storing the initial number comprises storing a symbol number corresponding to a received Orthogonal Frequency Division Multiplex (OFDM) symbol.

17. The method of claim 15, wherein loading the shift register with the initial comparison value comprises loading the shift register with a largest power of two multiple of a modulus that is less than a maximum initial value.

18. The method of claim 17, wherein the maximum initial value comprises a maximum Orthogonal Frequency Division Multiplex (OFDM) symbol number.

19. The method of claim 17, wherein repeating the process cycle comprises repeating the process cycle for fewer cycles than a power of two exponent used to determine the largest power of two multiple of the modulus that is less than the maximum initial value.

20. The method of claim 15, wherein loading the shift register with the initial comparison value comprises:
   determining a modulus from a plurality of moduli;
   selecting a value corresponding to a largest power of two multiple of the modulus that is less than a maximum initial value; and
   loading the shift register with the largest power of two multiple of a modulus that is less than a maximum initial value.

21. A method of performing a modulo operation, the method comprising:
   loading a symbol number from a superframe into a register;
   loading a value into a shift register;
   loading a difference between the register and shift register into the register if the register value minus the shift register value is greater than zero (0);
   right-shifting the shift register;
   stopping the method if the difference is between a lower limit and an upper limit; and outputting the difference as a modulo value of the symbol number when the difference is between the lower limit and the upper limit.

22. The method of claim 21, wherein an initial value loaded into the shift register is 896.

23. The method of claim 21, wherein the lower limit is zero and the upper limit is 13.

24. An apparatus configured to perform a modulo operation, the apparatus comprising:
   memory configured to store one of an initial value or a difference value;
   a shift register configured to store a comparison value;
   a subtractor coupled to the register and the shift register and configured to subtract a shift register value from a register value to generate the difference value;
   a first comparator configured to determine if the difference value is less than zero and configured to control the register to store the difference value if the difference value is not less than zero; and
   a second comparator configured to compare the difference value to a modulus value, and configured to cause the shift register to right shift the comparison value if the difference value is not less than the modulus.

25. The apparatus of claim 24, further comprising a multiplexer having the initial value coupled to a first input, the difference value coupled to a second input, and an output coupled to the memory, and wherein the multiplexer is controlled to select the initial value for a first cycle and select the difference value for subsequent cycles.

26. The apparatus of claim 24, wherein the memory comprises a register.

27. The apparatus of claim 24, wherein the memory comprises a D flip-flop.

28. The apparatus of claim 24, wherein the shift register is initially loaded with the comparison value equal to a largest power of two multiple of the modulus that is less than a maximum initial value.

29. The apparatus of claim 28, wherein the modulus is selected from a plurality of moduli.

30. A non-transitory computer readable media embodying instructions for performing a modulo operation, the instructions comprising:
   (a) storing an initial value in a first register;
   (b) storing an initial comparison value in a second register;
   (c) determining a difference of the second register value from the first value;
   (d) determining if the difference is less than zero,
   (e) storing the difference in the first register if the difference is not less than zero;
   (f) dividing the second register value by two and storing the result in the second register; and
   (g) repeating at least a portion of (c) through (f) until the difference is less than a modulus value.

31. The non-transitory computer readable media of claim 30, wherein storing the initial value in the first register comprises:
   receiving the initial value at a first input of a multiplexer;
   selecting the initial value to output from the multiplexer; and
   clocking the initial value into the first register.

32. The non-transitory computer readable media of claim 30, wherein storing the initial value in the first register comprises storing a symbol number corresponding to a received Orthogonal Frequency Division Multiplex (OFDM) symbol.

33. The non-transitory computer readable media of claim 30, wherein storing the initial comparison value comprises loading a shift register with the initial comparison value.

34. The non-transitory computer readable media of claim 33, wherein dividing the second register value by two comprises right shifting the shift register.

35. The non-transitory computer readable media of claim 30, wherein storing the initial comparison value comprises loading a shift register with a largest power of two multiple of the modulus that is less than a maximum initial value.

36. The non-transitory computer readable media of claim 35, wherein the maximum initial value comprises a predetermined maximum value.

37. The non-transitory computer readable media of claim 35, wherein the maximum initial value comprises a maximum value that can be represented by bits of the first register.

38. The non-transitory computer readable media of claim 30, further comprising:
   (h) outputting the difference as a modulo value of the initial input value when the difference is less than the modulus value, wherein the modulo value is based on the modulus value.

39. An apparatus configured to perform a modulo operation, the apparatus comprising:
   means for storing one of an initial value or a difference value;
   means for storing a comparison value;
   means for subtracting the comparison value from the one of the initial value or the difference value to update the difference value;
   means for comparing the difference value to zero and configured to control the register to store the difference value if the difference value is not less than zero; and
   means for comparing the difference value to a modulus value, and configured to cause the means for storing the comparison value to right shift the comparison value if the difference value is not less than the modulus.

40. The apparatus of claim 39, further comprising a means for selecting one of the initial value or the difference value coupled to the means for storing one of the initial value or the difference value, and configured to select the initial value at a first cycle and the difference value for subsequent cycles.

* * * * *

UNITED STATES PATENT AND TRADEMARK OFFICE
CERTIFICATE OF CORRECTION

PATENT NO. : 7,916,812 B2  Page 1 of 1
APPLICATION NO. : 11/370521
DATED : March 29, 2011
INVENTOR(S) : Kevin Stuart Cousineau It is certified that error appears in the above-identified patent and that said Letters Patent is hereby corrected as shown below:

Column 20, line 29, claim 38: "initial input value" to read as --initial value--

Column 20, line 42, claim 39: "the register" to read as --a register--

Signed and Sealed this
Eighth Day of May, 2012

David J. Kappos
*Director of the United States Patent and Trademark Office*